(12) United States Patent
Tanaka

(10) Patent No.: US 6,749,349 B2
(45) Date of Patent: Jun. 15, 2004

(54) SECTOR BLADE DRIVING DEVICE OF A CAMERA

(75) Inventor: Hitoshi Tanaka, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/187,994

(22) Filed: Jul. 3, 2002

(65) Prior Publication Data
US 2003/0007801 A1 Jan. 9, 2003

(30) Foreign Application Priority Data
Jul. 6, 2001 (JP) ........................................ 2001-206156

(51) Int. Cl.⁷ .............................. G03B 9/08; G03B 9/20
(52) U.S. Cl. ....................................... 396/454; 396/500
(58) Field of Search ................................. 396/449, 451, 396/453, 454, 493, 497, 500

(56) References Cited

U.S. PATENT DOCUMENTS 3,685,418 A   8/1972   Moriyama
4,416,527 A   11/1983  Okura

FOREIGN PATENT DOCUMENTS

JP   7-14441   3/1995

OTHER PUBLICATIONS

English Language Translation for JP Appln. No. 7–14441.

Primary Examiner—Russell Adams
Assistant Examiner—Rochelle Blackman
(74) Attorney, Agent, or Firm—Greenblum & Bernstein, P.L.C.

(57) ABSTRACT

A sector blade driving device includes a plurality of sector blades which define an adjustable photographic aperture, and a cylindrical member which surrounds the periphery of the sector blades to prevent harmful light from entering the photographic aperture from outside of the sector blade driving device. At least part of the cylindrical member which the sector blades press against when the plurality of sector blades are fully opened is made of a resilient material.

15 Claims, 5 Drawing Sheets

SECTOR BLADE DRIVING DEVICE OF A CAMERA

BACKGROUND OF THE INVENTION

1. Field of the Invention

The present invention relates to a device for driving a plurality of sector blades which serves as a lens shutter or an iris diaphragm of a camera.

2. Description of the Related Art

In a typical sector blade driving devices of a camera such as lens shutters and iris diaphragms, a plurality of sector blades (shutter blades or diaphragm blades) are driven to change the size (diameter) of a continuously adjustable photographic aperture (lens aperture) formed at the center of the plurality of sector blades. Such sector blade driving devices generally have a fixed photographic aperture, a plurality of sector blades and a cylindrical portion which surrounds the sector blades. The sector blades enter or retreat from an optical path defined by the fixed photographic aperture to change the size of the photographic aperture (the adjustable photographic aperture) of the sector blade driving device, while the cylindrical portion surrounds the sector blades to prevent harmful light such as stray light from coming into an optical path defined by the photographic aperture of the sector blade driving device.

In such conventional sector blade driving devices, there must be a radial clearance between the inner peripheral surface of the cylindrical portion and the radially outermost position in the range of movement of each sector blade to prevent each sector blade from bumping against the inner peripheral surface of the cylindrical portion. Such a radial clearance is a leading cause of an increase in size of the sector blade driving device.

SUMMARY OF THE INVENTION

The present invention has been devised in view of the problem noted above, and accordingly provides a compact sector blade driving device, and in particular, provides a small diameter.

For example, a sector blade driving device is provided, including a plurality of sector blades which define an adjustable photographic aperture; a cylindrical member which surrounds the periphery of the sector blades to prevent harmful light from entering the photographic aperture from outside of the sector blade driving device; resilient contact-portions which form a part of the cylindrical member, each of the resilient contact-portions corresponding to each the sector blades. The sector blades are in contact with the resilient contact-portions when the sector blades are fully opened.

The cylindrical member can include a cylindrical body having openings in which each outer peripheral portion of the sector blades can enter, respectively, when the sector blades are fully opened; and resilient sheets attached to the cylindrical body so as to cover the openings, respectively, so that each the sector blades is in contact with each the resilient sheets through the openings when the sector blades are fully opened.

One of opposite ends, of each of the resilient sheets, which extends in a circumferential direction of the cylindrical member can be secured to an outer peripheral surface of the cylindrical body, wherein the other end of each of the resilient sheets is not secured to the cylindrical member.

One of opposite ends, of each of the resilient sheets, which extends in an optical axis direction of a photographing optical system can be secured to an outer peripheral surface of the cylindrical body, wherein the other end of each of the resilient sheets is not secured to the cylindrical member.

The entire outer edge of each of the resilient sheets can be secured to an outer peripheral surface of the cylindrical body.

It is desirable for the cylindrical member to include a fixed photographic aperture positioned adjacent to the plurality of sector blades to be in alignment with the adjustable photographic aperture.

The sector blade driving device can further include a cylindrical base to which the cylindrical member is fixed, wherein the plurality of sector blades being positioned between the cylindrical base and the cylindrical member.

The sector blade driving device can further include a drive ring which is supported by the cylindrical base to be rotatable in a circumferential direction of the cylindrical base, the plurality of sector blades being driven via rotation of the drive ring.

It is desirable for the cylindrical member and the cylindrical base to include a first fixed photographic aperture and a second fixed photographic aperture, respectively, the adjustable photographic aperture defined by the plurality of sector blades being positioned between the first fixed photographic aperture and the second fixed photographic aperture and in alignment with the first fixed photographic aperture and the second fixed photographic aperture in an optical axis direction of a photographing optical system.

In another embodiment, a sector blade driving device is provided, including a plurality of sector blades which defines an adjustable photographic aperture; a cylindrical member having a cylindrical wall surrounding the periphery of the sector blades, a plurality of slots being formed on the cylindrical wall so that the sector blades can partly enter the slots when fully opened, respectively; and a plurality of resilient members which cover the slots so that the sector blades are in contact with the resilient members through the slots when the sector blades are fully opened, respectively.

Each of the resilient members can be partly fixed to the cylindrical member.

The present disclosure relates to subject matter contained in Japanese Patent Application No.2001-206156 (filed on Jul. 6, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
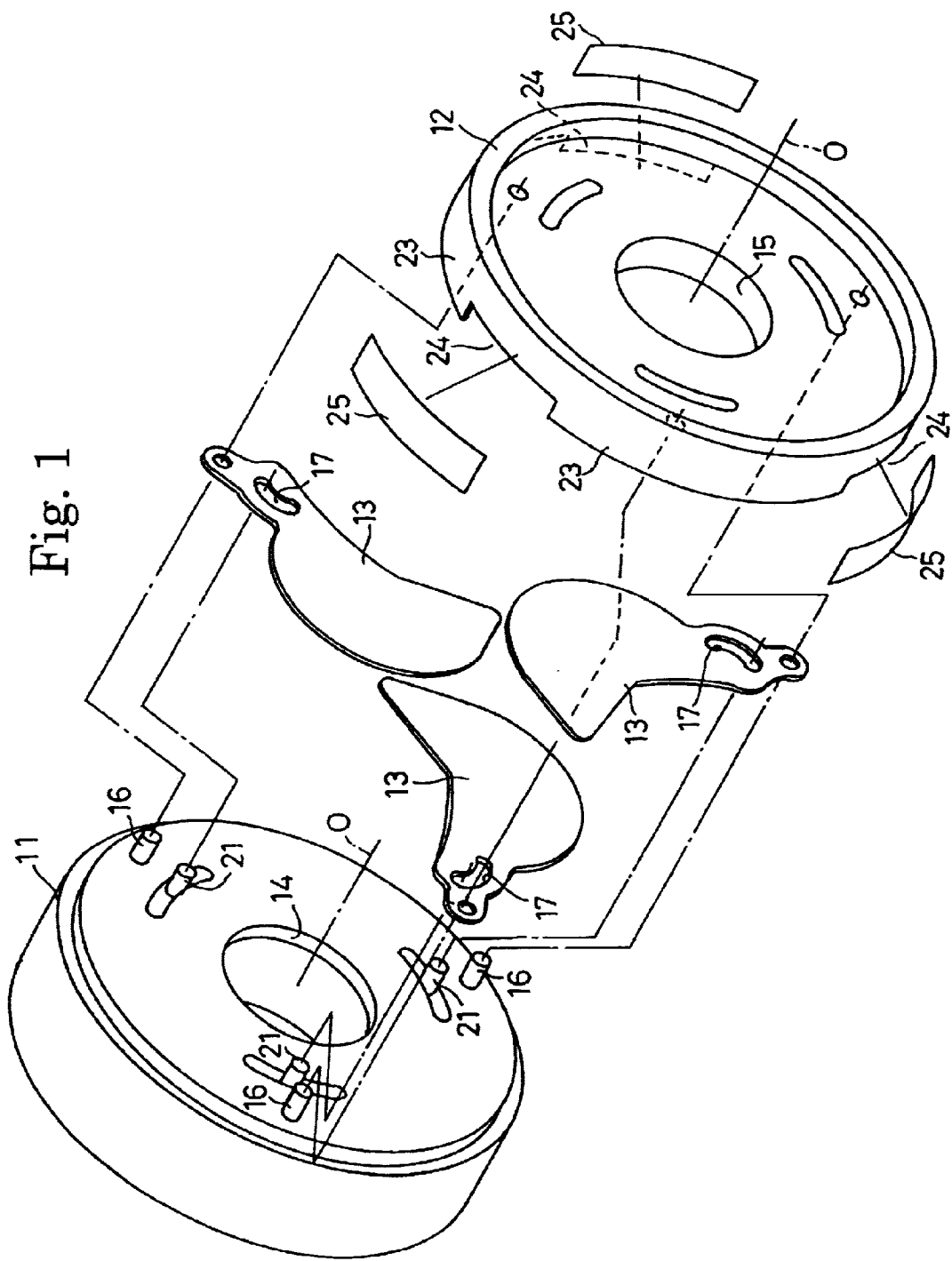
FIG. 1 is an exploded perspective view of the first embodiment of a sector blade driving device of a camera according to the present invention.
Figure 5:
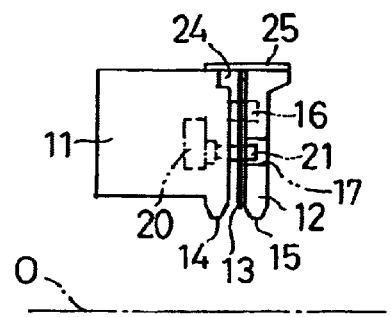
FIG. 5 is a cross sectional view taken along V—V line in FIG. 3.
Figure 6:
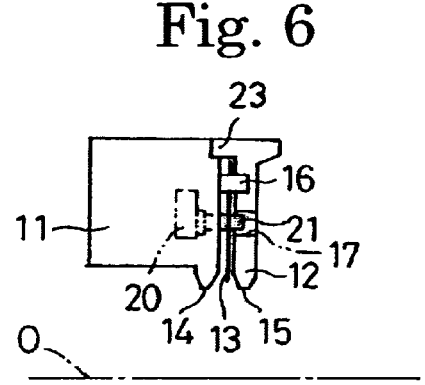
FIG. 6 is a cross sectional view taken along VI—VI line in FIG. 3.
Figure 7:
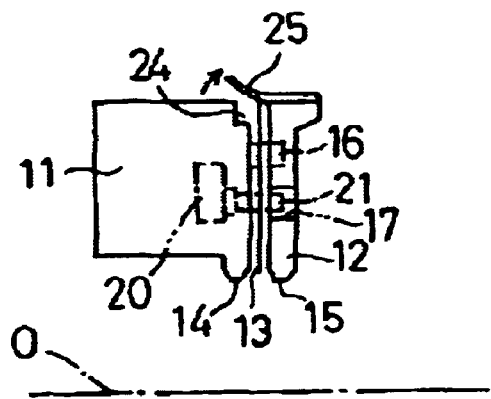
FIG. 7 is a cross sectional view taken along VII—VII line in FIG. 4.
Figure 8:
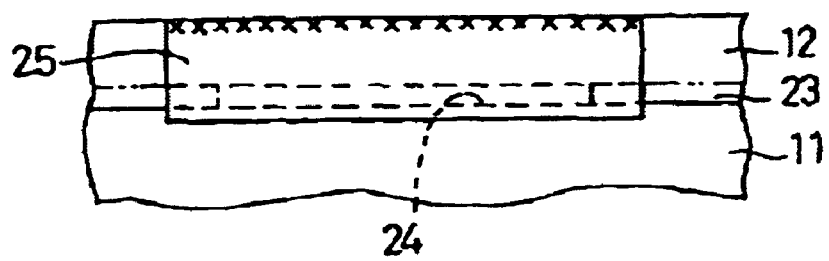
FIG. 8 is a developed view of a fundamental portion of the sector blade driving device, viewed in the direction of an arrow VIII in FIG. 2, showing a resilient sheet and the periphery thereof.
Figure 9:
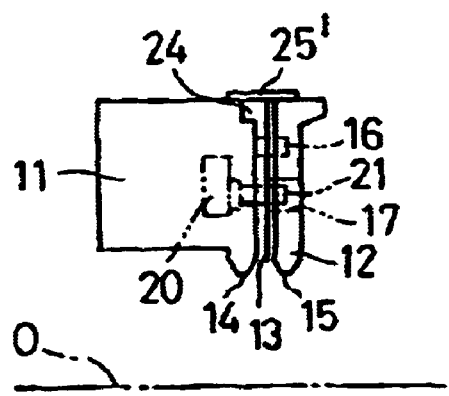
FIG. 9 is a view similar to that of FIG. 5, showing the second embodiment of the sector blade driving device in a state where the sector blades are fully open.
Figure 10:
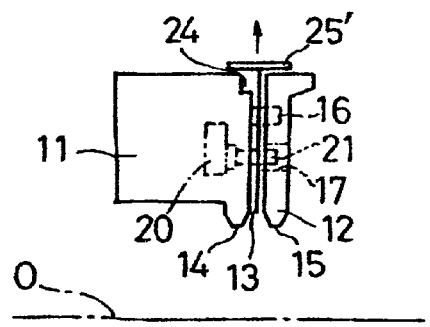
FIG. 10 is a view similar to that of FIG. 7, showing the sector blade driving device shown in FIG. 9 in a sate where each sector blade presses against an associated resilient sheet by inertia, beyond the fully-open position shown in FIG. 9.

FIGS. 1 through 8 show the first embodiment of a sector blade driving device according to the present invention. The sector blade driving device serves as a lens shutter driving device of a camera. As shown in FIGS. 1, 5 and 7, the sector blade driving device is provided with a cylindrical base 11, a cylindrical cover (cylindrical member/cylindrical body) 12 and three shutter blades (sector blades) 13 held between the cylindrical base 11 and the cylindrical cover 12. The cylindrical base 11 and the cylindrical cover 12 are provided with fixed circular apertures (fixed photographic apertures) 14 and 15 which are centered about an optical axis O of a photographing optical system (not shown), respectively. The diameters of the fixed circular apertures 14 and 15 are the same. Note that in FIGS. 2 through 4, the cylindrical base 11 which is positioned in front of the shutter blades 13 is not shown.

Figure 2:
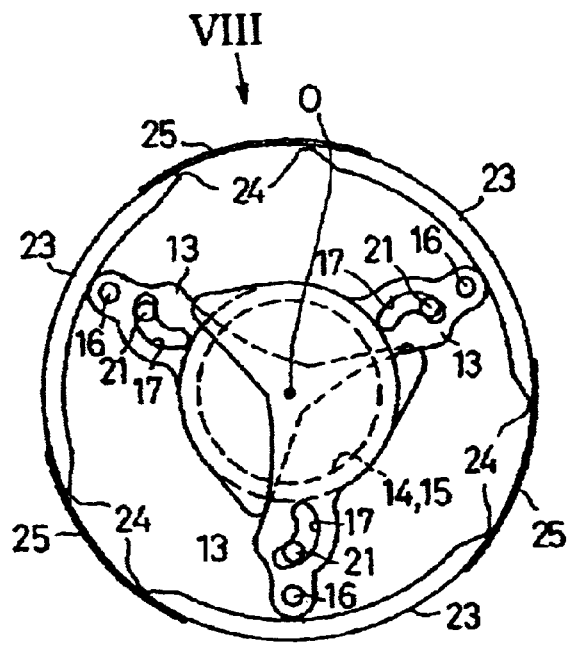
FIG. 2 is a front elevational view of the sector blade driving device shown in FIG. 1, with a thereof being removed, showing a state where a plurality of sector blades are fully closed.
Figure 3:
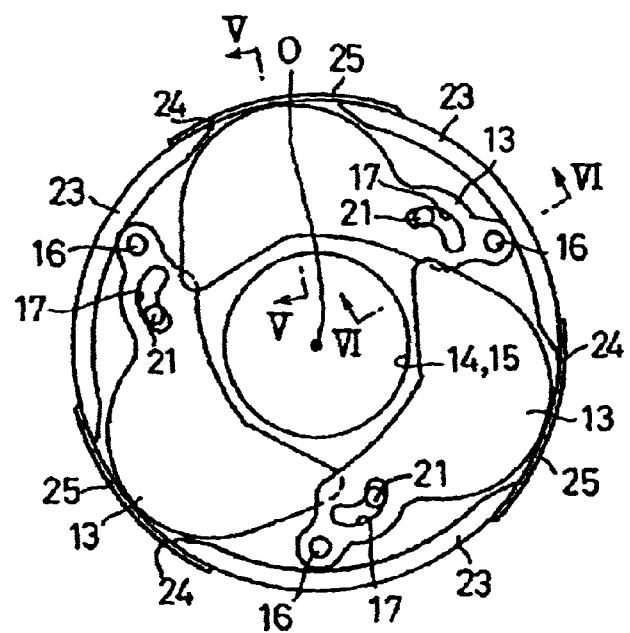
FIG. 3 is a view similar to that of FIG. 2, showing a state where the sector blades are fully open.
Figure 4:
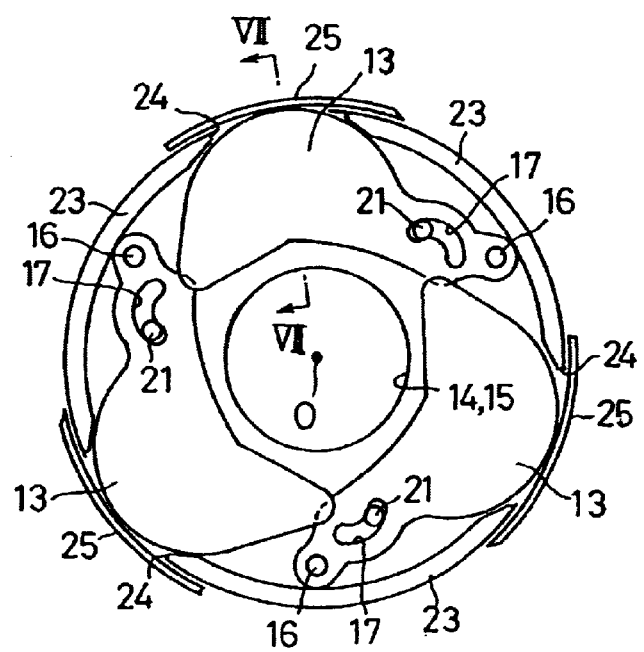
FIG. 4 is a view similar to that of FIG. 2, showing a state where each sector blade presses against an associated resilient sheet by inertia, beyond the fully-open position shown in FIG. 3.

The shutter blades 13 have a variable diaphragm function to determine a desired aperture value and a shutter function, and are electrically controlled so that the amount of opening (aperture value) and the opening time (shutter speed) of the shutter blades 13 are varied in accordance with the exposure value when the shutter is released. As shown in FIGS. 2, 3 and 4, the shutter blades 13 includes three sector blades which are respectively pivoted at three pivots 16 arranged circumferentially at regular intervals about the optical axis O. Each shutter blade 13 is provided in the vicinity of the pivoted end thereof with an arc guide slot 17 in which a drive pin 21 projecting from a shutter drive ring 20 is engaged. The shutter drive ring 20 is shown by two-dot chain line in FIGS. 5, 6 and 7, and is positioned inside the cylindrical base 11. The shutter drive ring 20 is centered about the optical axis O, and is supported by the cylindrical base 11 to be rotatable about the optical axis O. The shutter drive ring 20 can be rotated (driven) forwardly and reversely about the optical axis O by a motor (not shown). Rotating the shutter drive ring 20 causes the three drive pins 21 to move in the three arc guide slots 17, respectively. This causes each shutter blade 13 to rotate about the associated pivot 16 in accordance with the shape of the associated arc guide slot 17 to thereby enter and retreat from an optical path defined by the fixed circular apertures 14 and 15.

More specifically, if the shutter drive ring 20 rotates counterclockwise in a state where the shutter blades 13 are fully closed as viewed in FIG. 2, each drive pin 21 moves in the associated arc guide slot 17 from one end (outer end) to the other end (inner end) thereof to fully open the shutter blades 13 as shown in FIG. 3. In a state shown in FIG. 3 where the shutter blades 13 are fully open with maximum aperture, the fixed circular apertures 14 and 15, having the same diameter, function as the photographic aperture (lens aperture) of the sector blade driving device because the shutter blades 13 fully retreat radially outwards from the fixed circular apertures 14 and 15. If the shutter drive ring 20 rotates clockwise in a state where the shutter blades 13 are fully open as viewed in FIG. 3, each drive pin 21 moves in the associated arc guide slot 17 from the inner end to the outer end thereof to fully close the shutter blades 13 as shown in FIG. 2. In an intermediate position between the fully closed state shown in FIG. 2 and the fully open state shown in FIG. 3, the shutter blades 13 overlap each other to form an approximate-circular aperture (not shown) at the center of the shutter blades 13. Such an approximate-circular aperture is smaller in diameter than the fixed circular apertures 14 and 15, and thus functions as a photographic aperture of the sector blade driving device. The size of the photographic aperture formed by the shutter blades 13 can be adjusted by varying the positions of the three drive pin 21 in the arc guide slots 17, i.e., by varying the rotational position of the shutter drive ring 20.

The cylindrical cover 12 is provided with three circumferential wall portions 23 which surround the three shutter blades (in the radial direction). The circumferential wall portions 23 are formed at regular intervals about the optical axis O at circumferential positions to cover the pivoted ends of the three shutter blades 13, respectively. Between each adjacent circumferential wall portions 23 is formed an opening (slot) 24 through which the inside of the cylindrical cover 12 communicatively connects with the outside of the cylindrical cover 12. Accordingly, the cylindrical cover 12 is provided with three openings 24 which are formed at regular intervals about the optical axis O. The cylindrical cover 12 which includes the three circumferential wall portions 23 is made of metal or synthetic resin.

The cylindrical cover 12 is provided, on an outer peripheral surface thereof over each opening 24, with a resilient sheet (resilient contact-portion) 25 made of a resilient material such as rubber. Each resilient sheet 25 is elongated along the associated opening 24 in a circumferential direction about the optical axis O. One of opposite ends of each resilient sheet 25 in a direction of the optical axis O (the upper end as viewed in FIG. 8) is bonded to an outer peripheral surface of the cylindrical cover 12 with an adhesive while the remaining part (front end portion) of each resilient sheet 25 is provided as a free end. The crosshatched area in FIG. 8 indicates the bonded portion of each resilient sheet 25. When in a free state, each resilient sheet 25 is in intimate contact with corresponding outer peripheral surfaces of the cylindrical base 11 and the cylindrical cover 12 around the associated opening 24 to totally close the opening 24 (see FIGS. 2, 3 and 5). Accordingly, the three resilient sheets 25 and the three circumferential wall portions 23 serve as light shield members so that harmful light does not enter an optical path defined by the photographic aperture of the sector blade driving device from the gap between the cylindrical base 11 and the cylindrical cover 12.

In a state where the shutter blades 13 are fully open as shown in FIG. 3, the outer edge of each shutter blade 13 slightly projects radially outwards from an imaginary cylindrical surface on which the inner peripheral surfaces of the three circumferential wall portions 23 lie. Such a slightly projecting portion of each shutter blade 13 is hereinafter referred to as a radial-outermost portion. Since the radial-outermost portions of the shutter blades 13 enter the openings 24 when the shutter blades 13 are fully open, the shutter blades 13 can fully open without interfering the cylindrical walls 23 at all. In a state where the shutter blades 13 are fully open as shown in FIG. 3, the radial-outermost portion of each shutter blade 13 is slightly in contact with the associated resilient sheet 25.

When the shutter drive ring 20 is rotated to fully open the shutter blades 13, each shutter blade 13 may rotate beyond the fully-open position thereof shown in FIG. 3 due to inertia. If each shutter blade 13 rotates beyond the fully-open position, the radial-outermost portion of each shutter blade 13 presses against the associated resilient sheet 25 to thereby deform the resilient sheet 25 slightly radially outwards. Namely, each resilient sheet 25 deforms so that the front end portion (free end) thereof slightly lifts radially outwards since the rear end of each resilient sheet 25 is bonded to an outer peripheral surface of the cylindrical cover 12. Such deformation of the resilient sheets 25 absorb the pressing-contact of the shutter blades 13. This prevents the shutter blades 13 from bouncing back radially inwards. Although the front end portion of each resilient sheet 25 lifts slightly radially outwards from the associated opening 24 when the radial-outermost portion of each shutter blade 13 presses against the associated resilient sheet 25, the light shield effect of the three resilient sheets 25 does not substantially deteriorate because the operating time of the sector blade driving device at a time of exposure is very short and because only a part of each resilient sheet 25 lifts slightly.

As can be understood from the above description, the first embodiment of the sector blade driving device can be further miniaturized, especially in diameter, without substantially deteriorating both the light shield structure of the sector blade driving device around the shutter blades 13 and the position control thereof, since the portions of the circumferential wall portion 23 of the cylindrical cover 12, which the radial-outermost portions of the shutter blades 13 press against when the shutter blades 13 are fully opened, are respectively formed as the resilient sheets 25.

In conventional sector blade driving devices, a circumferential wall portion of a cylindrical cover, which corresponds to the circumferential wall portions 23 of the cylindrical cover 12 of the above illustrated embodiment of the sector blade driving device, extends around the entire circumference thereof, and therefore, a radial clearance needs to be provided between the inner peripheral surface of the circumferential wall portion and the radially outermost position of the range of movement of each sector blade in consideration of the case where shutter blades rotates beyond the fully-open position thereof due to inertia when the shutter blades are fully opened.

However, such a radial clearance does not have to be provided in the above illustrated embodiment because the resilient sheets 25 absorb the pressing-contact of the shutter blades 13 via resilient deformation of the resilient sheets 25. This prevents the shutter blades 13 from bouncing back radially inwards, and effectively defines the fully-open positions of the shutter blades 13. Accordingly, in the above illustrated embodiment of the sector blade driving device, no radial clearance has to be provided in expectation of an overrun of the shutter blades 13, which makes it possible to minimize the diameter of the sector blade driving device.

FIGS. 9 through 12 show the second embodiment of the sector blade driving device according to the present invention. This embodiment is to the same as the first embodiment of the sector blade driving device except for the difference in the fixing area of each resilient sheet to the circumferential wall portion 23. Accordingly, parts and elements of the second embodiment which are similar to those of the first embodiment are designated by the same reference numerals, and are not hereinafter discussed. Note that the cylindrical base 11, which is positioned in front of the shutter blades 13, is not shown in FIG. 11, similar to FIGS. 2 through 4.

Figure 12:
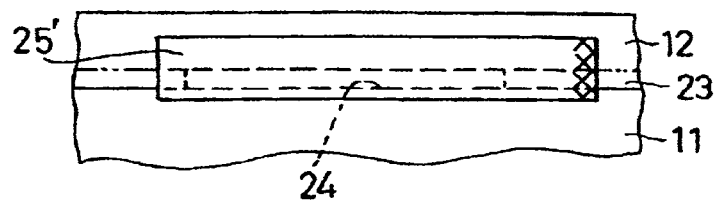
FIG. 12 is a view similar to that of FIG. 8, viewed in the direction of an arrow XII in FIG. 11, showing the resilient sheet and a periphery thereof.
Figure 11:
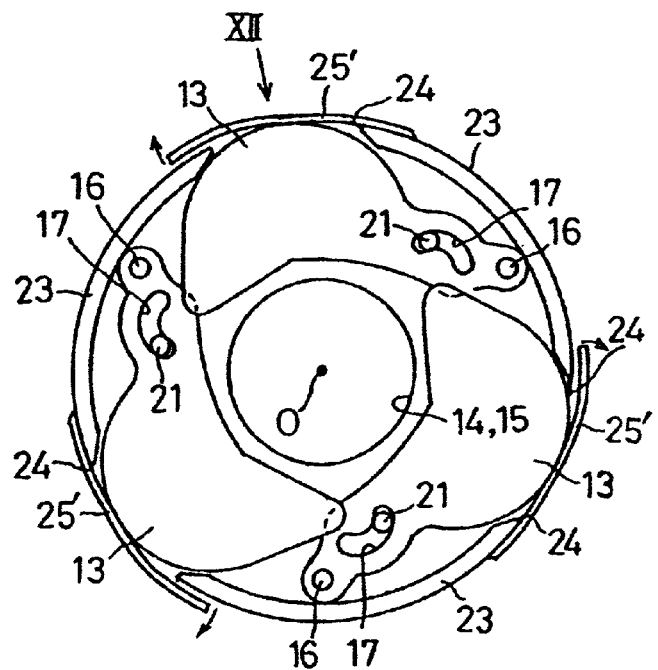
FIG. 11 is a front elevational view of the sector blade driving device shown in FIG. 10 with the thereof being removed.

As shown in FIG. 12, the cylindrical cover 12 is provided, on an outer peripheral surface thereof over each opening 24, with a resilient sheet 25' made of a resilient material such as rubber, similar to each resilient sheet 25 of the first embodiment of the sector blade driving device. Similar to the resilient sheets 25, each of the resilient sheets 25' is elongated along the associated opening 24 in a circumferential direction about the optical axis O. However, in the second embodiment of the sector blade driving device, one of opposite ends of each resilient sheet 25' in a circumferential direction of the cylindrical cover 12 is bonded so as to cross over both outer peripheral surfaces of the cylindrical base 11 and the cylindrical cover 12 while the other circumferential end of each resilient sheet 25' is provided as a free end. The crosshatched area in FIG. 12 indicates the bonded portion of each resilient sheet 25'. With this structure, when the radial-outermost portions of the three shutter blades 13 press against the three resilient sheets 25', respectively, each resilient sheet 25' deforms so that the free circumferential end thereof slightly lifts radially outwards. When in a free state, each resilient sheet 25' is in intimate contact with corresponding outer peripheral surfaces of the cylindrical base 11 and the cylindrical cover 12 around the associated opening 24 to totally close the opening 24 (see FIG. 9). This makes it possible to minimize the diameter of the sector blade driving device, similar to the first embodiment of the sector blade driving device.

The present invention is not limited solely to the above illustrated first and second embodiments of the sector blade driving devices. For instance, similar to the resilient sheets 25 or 25', the circumferential wall portion 23 (and the opening 24) can be made of a resilient material such as rubber.

Although each of the first and second embodiments of the sector blade driving devices serves as a lens shutter driving device of a camera, the present invention can also be applied to a sector blade driving device serving as an iris diaphragm driving device of a camera that is provided with a plurality of diaphragm blades.

Although only a part of each resilient sheet 25 or 25' is fixed to an outer peripheral surface of the cylindrical cover 12 or both outer peripheral surfaces of the cylindrical base 11 and the cylindrical cover 12 while the remaining part of each resilient sheet 25 or 25' is provided as a free end in each of the first and second embodiments of the sector blade driving devices, the entire outer edge of each resilient sheet 25 or 25' can be fixed to outer peripheral surfaces of the cylindrical base 11 and the cylindrical cover 12 to totally close the associated opening 24 at all times even when the radial-outermost portion of each shutter blade 13 presses against the associated resilient sheet 25 or 25'. This improves the light shield effect of the three resilient sheets 25. In this case, it is desirable for each resilient sheet to be made of a softer, more flexible material than the resilient material of each resilient sheet used in each of the first and second embodiments of the sector blade driving devices.

As can be understood from the above descriptions, according to the present invention, since a sector blade driving device is provided, including a plurality of sector blades which define an adjustable photographic aperture, and a cylindrical member which surrounds the periphery of the plurality of sector blades to prevent harmful light from entering an optical path defined by the adjustable photographic aperture from outside of the sector blade driving device; wherein at least part of the cylindrical member which the plurality of sector blades press against when the plurality of sector blades are fully opened is made of a resilient material, a compact sector blade driving device having a small diameter is achieved.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A sector blade driving device, comprising:
    a plurality of sector blades which define an adjustable photographic aperture;
    a cylindrical member which surrounds the periphery of said sector blades to prevent harmful light from entering said photographic aperture from outside of said sector blade driving device;
    resilient contact-portions provided on an outer periphery of said cylindrical member and which form a part of said cylindrical member, each of said resilient contact-portions configured to contact an edge of one of said sector blades;
    wherein said edge of said sector blades are in contact with said resilient contact-portions when said sector blades are fully opened.

2. The sector blade driving device according to claim 1, wherein said cylindrical member comprises:
    a cylindrical body having openings in which each outer peripheral portion of said sector blades can enter, respectively, when said sector blades are fully opened; and
    said resilient contact-portions comprise:
        resilient sheets attached to said cylindrical body so as to cover said openings, respectively, so that each of said sector blades is in contact with one of said resilient sheets through said openings when said sector blades are fully opened.

3. The sector blade driving device according to claim 2, wherein one of opposite ends, of each of said resilient sheets, which extends in a circumferential direction of said cylindrical member is secured to an outer peripheral surface of said cylindrical body; and
    wherein the other end of each of said resilient sheets is not secured to said cylindrical member.

4. The sector blade driving device according to claim 2, wherein one of opposite ends, of each of said resilient sheets, which extends in an optical axis direction of a photographing optical system is secured to an outer peripheral surface of said cylindrical body; and
    wherein the other end of each of said resilient sheets is not secured to said cylindrical member.

5. The sector blade driving device according to claim 2, wherein the entire outer edge of each of said resilient sheets is secured to an outer peripheral surface of said cylindrical body.

6. The sector blade driving device according to claim 1, said cylindrical member comprises a fixed photographic aperture positioned adjacent to said sector blades to be in alignment with said adjustable photographic aperture.

7. The sector blade driving device according to claim 1, further comprising a cylindrical base to which said cylindrical member is fixed, wherein said sector blades being positioned between said cylindrical base and said cylindrical member.

8. The sector blade driving device according to claim 7, further comprising a drive ring which is supported by said cylindrical base to be rotatable in a circumferential direction of said cylindrical base, said sector blades being driven via rotation of said drive ring.

9. The sector blade driving device according to claim 7, wherein said cylindrical member and said cylindrical base comprise a first fixed photographic aperture and a second fixed photographic aperture, respectively, said adjustable photographic aperture defined by said sector blades being positioned between said first fixed photographic aperture and said second fixed photographic aperture and in alignment with said first fixed photographic aperture and said second fixed photographic aperture in an optical axis direction of a photographing optical system.

10. A sector blade driving device, comprising:
    a plurality of sector blades which define an adjustable photographic aperture;
    a cylindrical member having a cylindrical wall surrounding the periphery of said sector blades, a plurality of slots being formed on said cylindrical wall so that said sector blades can partly enter said slots when fully opened, respectively; and
    a plurality of resilient members which cover said slots so that said sector blades are in contact with said resilient members through said slots when said sector blades are fully opened, respectively.

11. The sector blade driving device according to claim 10, wherein each of said resilient members is partly fixed to said cylindrical member.

12. A sector blade driving device, comprising:
    a plurality of sector blades which define an adjustable photographic aperture;
    a cylindrical member which surrounds the periphery of said sector blades to prevent harmful light from entering said photographic aperture from outside of said sector blade driving device;
    resilient contact-portions which form a part of said cylindrical member, each of said resilient contact-portions corresponding to one of said sector blades;
    wherein said sector blades are in contact with said resilient contact-portions when said sector blades are fully opened;
    wherein said cylindrical member comprises:
        a cylindrical body having openings in which each outer peripheral portion of said sector blades can enter, respectively, when said sector blades are fully opened; and
        resilient sheets attached to said cylindrical body so as to cover said openings, respectively, so that each of said sector blades is in contact with one of said resilient sheets through said openings when said sector blades are fully opened.

13. The sector blade driving device according to claim 12, wherein one of opposite ends, of each of said resilient sheets, which extends in a circumferential direction of said cylindrical member is secured to an outer peripheral surface of said cylindrical body; and
    wherein the other end of each of said resilient sheets is not secured to said cylindrical member.

14. The sector blade driving device according to claim 12, wherein one of opposite ends, of each of said resilient sheets, which extends in an optical axis direction of a photographing optical system is secured to an outer peripheral surface of said cylindrical body; and
    wherein the other end of each of said resilient sheets is not secured to said cylindrical member.

15. The sector blade driving device according to claim 12, wherein the entire outer edge of each of said resilient sheets is secured to an outer peripheral surface of said cylindrical body.

* * * * *